(12) United States Patent
Haregoppa et al.

(10) Patent No.: US 7,243,894 B2
(45) Date of Patent: Jul. 17, 2007

(54) MOUNT FOR VIBRATORY ELEMENTS

(75) Inventors: Gopal B. Haregoppa, Woodbury, MN (US); Satinder K. Nayar, Woodbury, MN (US); Donald S. Oblak, North St. Paul, MN (US); Ronald W. Gerdes, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/128,744

(22) Filed: Apr. 22, 2002

(65) Prior Publication Data

US 2003/0155403 A1    Aug. 21, 2003

Related U.S. Application Data

(60) Provisional application No. 60/357,724, filed on Feb. 15, 2002.

(51) Int. Cl.
*F16M 6/00*    (2006.01)

(52) U.S. Cl. .................... 248/638; 267/140.12

(58) Field of Classification Search ............... 188/378, 188/379, 380, 381; 248/638; 228/110.1; 228/1.1; 267/140.16, 140.12
See application file for complete search history.

(56) References Cited

U.S. PATENT DOCUMENTS

| | | | |
|---|---|---|---|
| 2,891,179 A | 6/1959 | Elmore | |
| 3,292,838 A | 12/1966 | Farley | |
| 3,350,582 A | 10/1967 | Attwood et al. | |
| 3,752,380 A | 8/1973 | Shoh | |
| 3,863,826 A | 2/1975 | Shoh | |
| 3,955,740 A | 5/1976 | Shoh | |
| 4,128,795 A * | 12/1978 | Habermann et al. | 318/618 |
| 4,361,213 A * | 11/1982 | Landis et al. | 188/378 |
| 4,392,681 A * | 7/1983 | Raquet | 295/7 |
| 4,400,227 A | 8/1983 | Riemersma | |
| 4,553,461 A | 11/1985 | Belongia | |
| 4,566,800 A * | 1/1986 | Bodine | 366/118 |
| 4,647,336 A * | 3/1987 | Coenen et al. | 156/580.1 |
| 4,804,131 A | 2/1989 | Cordemans de Meulenaer et al. | |
| 4,884,334 A | 12/1989 | Houser et al. | |
| 4,958,558 A | 9/1990 | Harreither | |

(Continued)

FOREIGN PATENT DOCUMENTS

DE    2928360    1/1981

(Continued)

OTHER PUBLICATIONS

Declaration of Ronald W. Gerdes with three attachments signed on Sep. 23, 2002.

*Primary Examiner*—Devon Kramer
(74) *Attorney, Agent, or Firm*—Rick L. Franzen (57) ABSTRACT

The invention is a mounting system for a vibrational element. The vibrational element has a longitudinal axis, an outer surface and an axial displacement node. The mounting system includes an isolation member which has an isolation surface, an isolating body, and an engaging portion. The engaging portion is immovably secured to the isolation member and extends radially inward from the isolation body at a point radially opposite the isolation surface. The engaging portion is disposed so as to engage the outer surface of the vibrational element. Radial displacements of the vibration element are substantially decoupled from the isolation surface through the engaging portion.

6 Claims, 3 Drawing Sheets

U.S. PATENT DOCUMENTS

| | | |
|---|---|---|
| 4,975,133 A | 12/1990 | Gochermann |
| 4,995,938 A | 2/1991 | Tsutsumi |
| 5,096,532 A | 3/1992 | Neuwirth et al. |
| 5,144,771 A | 9/1992 | Miwa |
| 5,145,259 A * | 9/1992 | Murano et al. ............... 384/1 |
| 5,364,005 A * | 11/1994 | Whelan et al. ............. 228/1.1 |
| 5,385,288 A | 1/1995 | Kyomasu et al. |
| 5,411,195 A | 5/1995 | Yamazaki et al. |
| 5,443,240 A | 8/1995 | Cunningham |
| 5,464,498 A | 11/1995 | McGrath |
| 5,468,336 A | 11/1995 | Lotz et al. |
| 5,486,733 A | 1/1996 | Yamazaki et al. |
| 5,504,381 A * | 4/1996 | Kato ........................... 310/51 |
| 5,522,585 A * | 6/1996 | Loziuk ....................... 267/148 |
| 5,590,866 A | 1/1997 | Cunningham |
| 5,595,328 A | 1/1997 | Safabakhsh et al. |
| 5,603,445 A | 2/1997 | Hill et al. |
| 5,660,256 A * | 8/1997 | Gallmeyer et al. ......... 188/379 |
| 5,707,483 A | 1/1998 | Nayar et al. |
| 5,772,100 A | 6/1998 | Patrikios |
| 5,976,316 A * | 11/1999 | Mlinar et al. ............ 156/580.2 |
| 6,095,922 A * | 8/2000 | Friedrichsen et al. ......... 464/24 |
| 6,393,624 B1 * | 5/2002 | Iwashita ......................... 4/248 |
| 6,481,281 B1 * | 11/2002 | Gerdes ......................... 73/460 |
| 6,786,384 B1 * | 9/2004 | Haregoppa .................. 228/1.1 |
| 2003/0075406 A1 * | 4/2003 | Nylander .................... 188/379 |

FOREIGN PATENT DOCUMENTS

| | | |
|---|---|---|
| GB | 2243092 A | 10/1993 |
| WO | WO 01/53032 A1 | 7/2001 |
| WO | WO 03/051535 A1 | 6/2003 |

* cited by examiner

MOUNT FOR VIBRATORY ELEMENTS

TECHNICAL FIELD

This application is claiming priority to U.S. Provisional Application Serial No. 60/357,724, filed Feb. 15, 2002, hereby incorporated by reference in its entirety. The present invention relates to vibrational elements. More particularly, the present invention relates to mounting systems for acoustic horns.

BACKGROUND OF THE INVENTION

In acoustic welding, such as ultrasonic welding, two parts to be joined (typically thermoplastic parts) are placed directly below a vibrational element, typically an ultrasonic horn. In plunge welding, the horn plunges (travels towards the parts) and transmits vibrations into the top part. Typically these vibrations are ultrasonic. The vibrations travel through the top part to the interface of the two parts. At that interface, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In continuous welding, the ultrasonic horn is typically stationary and the part is moved beneath it. Scan welding is a type of continuous welding in which the part moves. The plastic part is scanned beneath one or more stationary horns. In transverse welding, the part is stationary while the horn moves over it.

The horn is an acoustical tool made of, for example, aluminum, titanium, or sintered steel that transfers the mechanical vibratory energy to the part. Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the welding surface of the horn is coincident with the direction of the applied mechanical vibrations.

A rotary acoustic horn, like all horns, imparts energy at a selected wavelength, frequency, and amplitude. The rotary horn includes a shaft with input and output ends, and a welding portion mounted on and coaxial with the output end. The diameter of the welding portion is typically greater than the diameter of the shaft. The welding portion has a cylindrical weld face having a diameter that expands and contracts with the application of vibration energy. Typically, a rotary horn is cylindrical and rotates about a longitudinal axis. The input vibration is in the axial direction and the output vibration is in the radial direction. The horn and anvil are close to each other, and the anvil can rotate in the opposite direction of the horn. The part to be bonded passes between these cylindrical surfaces at a linear velocity, which equals the tangential velocity of the cylindrical surfaces. Matching the tangential velocities of the horn and the anvil with the linear velocity of the material is intended to minimize the drag between the horn and the material. The excitation in the axial direction is similar to that in conventional plunge welding.

There are typically two methods of mounting an ultrasonic horn, nodal mounting and non-nodal mounting. A node is a position of the horn that is not moving in one or more directions. With a nodal mount the horn can be held or grasped rigidly. Non-nodal mounts require some flexible elements because the horn surface is moving (vibrating). The nodes on a horn typically extend circumferentially about the horn, and are spaced axially along the length of the horn.

Anti-nodes are areas of maximum displacement of the horn or booster, attaching mounting systems at these locations or at other non-nodal locations requires the mount to be designed to isolate the vibration from the horn.

U.S. Pat. No. 3,955,740 discloses a non-nodal rotary horn mount, which uses a solid metal diaphragm located in the junction between the booster and the horn. Static loads can be borne because the design uses a rotating tube to isolate this force from the bearings. Also, in this design the diaphragm is designed to resonate at the frequency of the horn. The diaphragm is an ultrasonic element. Another type of nodal mount utilizes a series of setscrews positioned radially around the node. To position the mount about the horn, the setscrews are threaded through the nodal mount and contact the surface of the horn. Typically they extend into a groove or notch in the surface of the horn to assure the mount maintains its position relative to the horn. While the setscrew type mount can isolate vibrations from the vibrating element, the static load, which can be imparted onto the mount, is limited to the ability of the setscrews to withstand the force.

SUMMARY OF THE INVENTION

The invention is a mounting system for a vibrational element. The vibrational element has a longitudinal axis, an outer surface and an axial displacement node. The mounting system includes an isolation member which has an isolation surface, an isolating body, and an engaging portion. The engaging portion is immovably secured to the isolation member and extends radially inward from the isolation body at a point radially opposite the isolation surface. The engaging portion is disposed so as to engage the outer surface of the vibrational element. Radial displacements of the vibration element are substantially decoupled from the isolation surface through the engaging portion.

BRIEF DESCRIPTION OF THE DRAWINGS

In this disclosure, different embodiments of the invention are illustrated. Throughout the drawings, like reference numerals are used to indicate common features or components of the device.

While the above-identified drawing figures set forth different embodiments of the apparatus used in the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION

Figure 1:
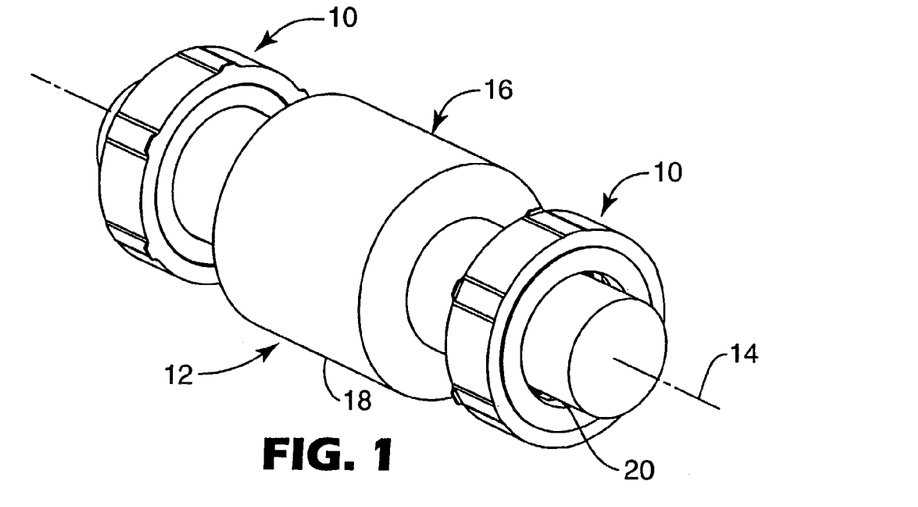
FIG. 1 is an isometric view of two inventive mounting assemblies secured to a vibratory horn.

The inventive mounting system is illustrated generally at 10 in FIG. 1. The inventive mounting system 10 is a non-resonant nodal mount. The mounting system 10 is secured to a vibrational element 12. In one embodiment, the vibrational element 12 is an ultrasonic horn used to weld thermoplastic material together. However, the mounting system 10 can be used with any vibrational element where it is desirable to "decouple" or prevent the vibrations of the vibrational element 12 from traveling through the mounting system 10 to whatever structure (typically some type of supporting structure) engages the mounting system 10.

The vibrational element 12 includes a longitudinal axis 14, and a vibrational outer surface 16. As discussed, one embodiment of the vibrational element is an ultrasonic horn. Ultrasonic typically implies a vibrational frequency of 20 kHz or greater. Additionally, while the configuration of the vibrational element (or "horn") in FIG. 1 illustrates a larger welding portion 18 and a smaller mounting portion 20 to which the mounting system 10 is secured, it should be noted that this configuration is exemplary and should not be construed as limiting.

While one embodiment of the invention utilizes two mounting systems 10, it should be noted that a "cantilevered" type horn having only one mounting system 10, or a horn utilizing more than two mounting systems 10 is also contemplated. A bearing assembly (not shown) is typically secured to mounting system 10, allowing vibrational element 12 to rotate about its longitudinal axis 14.

Figure 2:
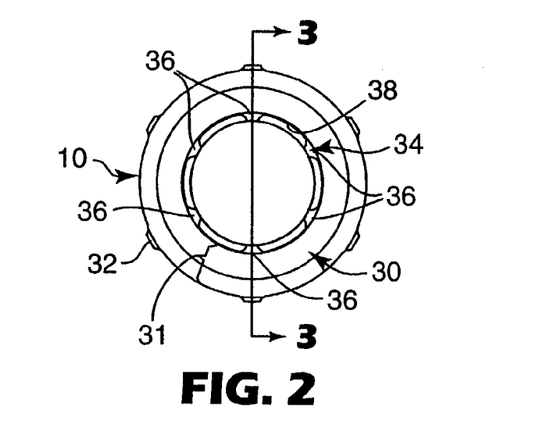
FIG. 2 illustrates an end view of the apparatus of FIG. 1.

As illustrated in FIG. 2, mounting system 10 includes isolation member 30. Isolation member 30 includes isolation body 31, isolation surface 32, inner surface 38 and engaging portion 34.

Engaging portion 34 extends radially inward from inner surface 38 of isolation member 30. In one embodiment, engaging portion 34 includes a series of engaging members (or tabs) 36. While six circumferentially disposed engaging members 36 are illustrated, any number of engaging members 36 may be used without departing from the scope of the invention. Additionally, one engaging member 36 extending in an unbroken ring around inner surface 38, discussed further below with respect to FIG. 4.

Figure 3:
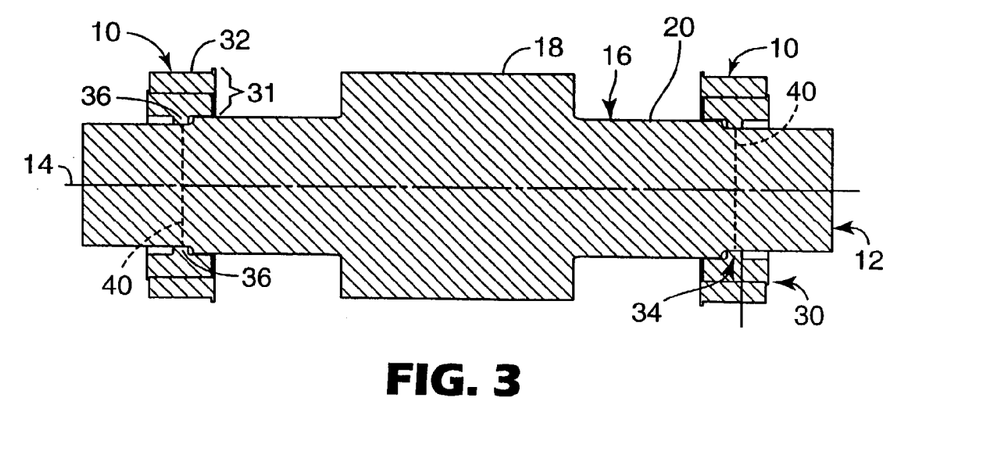
FIG. 3 illustrates a cross-sectional view of the vibratory apparatus as taken along line 3—3 of FIG. 2.

Engaging portion 34 of isolation member 30 is disposed against axial node 40 on vibrational outer surface 16 of vibrational element 12, as illustrated in FIG. 3. Axial node 40 (shown in dotted lines) extends circumferentially about vibrational outer surface 16 at a point along longitudinal axis 14 of vibrational element 12. Typically, multiple axial nodes are spaced at points along the longitudinal axis 14. Axial nodes are points at which substantially very little vibrational amplitude occurs in the axial direction of the horn (i.e., vibration in the direction of longitudinal axis 14). This is also the point of maximum vibrational amplitude in the radial direction, or in other words, the axial node is the radial anti-node.

Securing the isolation member 30 to axial node 40 assures that the engagement between the mounting system 10 and the vibrational element 12 is stable in the longitudinal direction, preventing wear of the engaging portion 34 and the vibrational element 12.

The vibrations from the vibrational element 12 in the radial direction are disconnected from the isolation surface 32 through isolation member 30, particularly through engaging portion 34. As mentioned previously, a bearing assembly (not shown) is typically mounted to isolation surface 32 allow vibrational element 12 to rotate about longitudinal axis 14. This bearing assembly, or any other connecting member, is used to secure the isolation member 30 to a support structure (not shown). Thus, the vibrations from vibrational element 12 are substantially "decoupled" or "disconnected" from isolation surface 32, and are also decoupled from any support structure by securing the isolation member 30 to the vibrational element 12 at axial node 40 and by preventing the radial vibrations from reaching isolation surface 32 through isolation body 31. While these connecting members (e.g. bearing assemblies) are not shown, a person skilled in the art would understand that these additional elements could be included as part of inventive mounting system 10 without departing from the spirit and scope of the invention.

"Decoupling" or "disconnecting" means that the vibrations themselves are prevented from reaching the isolation surface 32 of isolation member 30 through isolation body 31 and engaging portion 34, while minimizing the amount of energy from the vibrations that is dissipated (i.e. lost) through isolation member 30. Decoupling minimizes displacement of isolation surface 32, which reduces wear or damage to any connecting member (e.g. bearing assembly) or to isolation surface 32. Additionally, minimizing energy dissipation through isolation member 30 prevents excessive energy consumption and heating of isolation member 30.

The radial vibrations from vibrational element 12 are decoupled from the isolation surface 32 of isolation member 30 by designing the dimensions of isolation member 10 such that isolation member 10 does not have resonant frequencies near the operating frequency of vibrational element 12. Mounting system 10 provides a high level of radial stiffness such that an external radial force can be applied to mounting system 10 without affecting the performance of the vibrational disconnect. Preferably, any resonant frequencies of mounting system 10 are at least 500 Hz from the resonant frequency of vibrational element 12. Most preferably, any resonant frequencies of mounting system 10 are at least 1000 Hz from resonant frequency of vibrational element 12. Additionally, mounting system 10 preferably draws less than about twenty-five percent of the power required to resonate the vibrational element 12.

Many applications require the application of a high static load to the mounting system 10. The high static load is used to press the material being welded (typically polymeric) between vibrational outer surface 16 of vibrational element (exemplified by larger welding portion 18) and an anvil (not shown) which typically is a non-vibrating metallic mass. This is particularly true in adjustable gap type welding where a gap is maintained between vibrational element 12 and anvil (not shown). As the thickness of the material varies as it is being forced through this gap, a reactionary force can develop which is directed transversely to longitudinal axis 14 of vibrational element 12. Radial deflection of the previous mounting systems allowed the gap between the vibrational element and the anvil to increase, reducing the force on the part and affecting the weld quality. This occurred due to bending and/or compression of the mounting system.

The inventive mounting system 10 overcomes these difficulties and provides substantial decoupling of the vibrations, substantially low energy loss and the ability to transfer a higher load between vibrational element 12 and support structure with little variation in performance.

Figure 5:
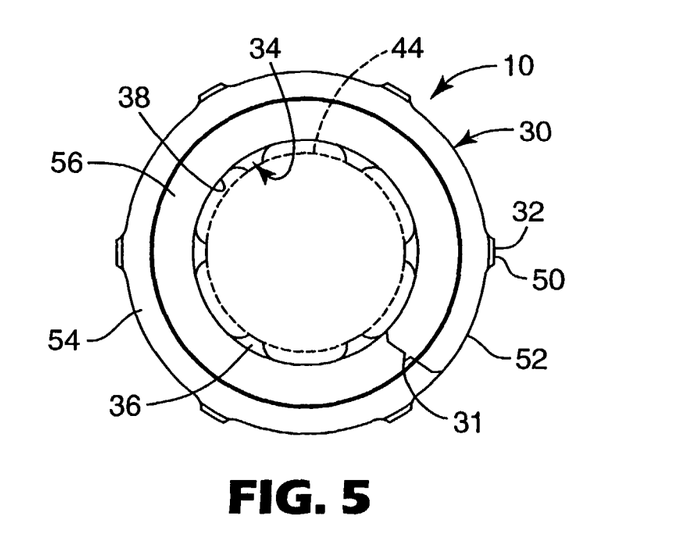
FIG. 5 is a side view of one embodiment of the inventive mounting system.

As shown in FIG. 5, isolation surface 32 is radially aligned with engaging portion 34 of isolation member 30. This positioning directs forces radially from the support structure, through isolation surface 32, isolation body 31, and engaging members 36 onto vibratory member 12. This radial alignment minimizes the creation of bending moments through mounting system 10 by radial forces. Inventive mounting system 10 can preferably withstand a radial force of at least about 500 lbs. (226 kgs) and more preferably about 800 lbs. (363 kgs) so as to result in a deflection of isolation member 30 of less than about 0.0003 inches (0.08 mm). Simultaneously, isolation member is able to decouple vibrations from isolation surface 32.

In one embodiment, the isolation member 30 has a radial stiffness of at least approximately $2.9 \times 10^8$ N/m. Preferably, the isolation member has a radial stiffness of approximately $4.7 \times 10^8$ N/m. Most preferably, the isolation member 30 has a minimum stiffness of approximately $1.36 \times 10^9$ N/m.

Thus, in contrast to previous mounting systems, the inventive mounting system provides radial stiffness while decoupling the vibrations occurring at engaging portion 34 from the isolation surface 32. The radial vibratory amplitude occurs at its greatest at engaging portion (e.g., 0.3 mils peak to peak amplitude) whereas radial vibration is substantially eliminated through isolation member 30 at isolation surface 32 (e.g., 0.06 mils peak to peak amplitude).

As mentioned, engaging members 36 preferably extend radially inward along inner surface 38 of isolation member 30. Engaging members 36 are preferably immovably mounted to isolation body 31. Most preferably, engaging members 36 are integrally formed with isolation body 31. Immovably mounting engaging members 36 to isolation body 31 (e.g., by welding or by integrally forming them) eliminates any movement of engaging members 36 with respect to isolation body 31, an event which could occur in previous mounting systems (such as setscrew type mounting systems). In the preferred embodiment, the engaging members 36 function so as to substantially decouple the vibrations between the vibrational element 12 and the isolation body 31. Preferably this decoupling occurs due to the engaging members 36 compressing and expanding according to the movement of outer surface 16 of vibrational element 12.

An additional advantage of immovably mounted engaging members 36 is the ability to interference fit isolation member 30 with vibrational element 12. Since inventive mounting system 10 is able to withstand high radial forces due to the level of stiffness of isolation member 30, forces created by interference fitting engaging members 36 with vibrational element 12 can be withstood without affecting the performance of inventive mounting system 10. For example, engaging members 36 can be interference fit such that an inner diameter defined by the engaging members 36 is smaller by about 0.004 inches (0.1 mm) to about 0.008 inches (0.2 mm) than the outer diameter of mounting portion 20 of vibrational element 12. The ability to interference fit the engaging members 36 with outer surface 16 of vibrational element 12 provides secure engagement between the two members and eliminates previous misalignment issues in prior mounting systems which caused wear between the engaging members.

The inventive mounting system 10 is preferably used in conjunction with a rotational type vibratory element and utilizes bearings mounted on the isolation surface 32 (discussed previously). Once engaging members 36 are interference fit on vibrational element 12, isolation surface 32 can be formed to be concentric with vibrational element 12. This forming is preferably accomplished by machining isolation surface 32. Thus, no radial alignment of inventive mounting system 10 (such as with setscrews used in previous mounting systems) is required to make isolation surface 32 concentric with the vibrational element 12. Similarly, engaging members 36 can be formed (again, preferably by machining) along engaging surface 42, illustrated in FIG. 4, before interference fitting, in order to improve concentricity.

While engaging portion 34 of isolation member 30 is discussed and illustrated as being separate engaging members 36 (i.e. six separate tabs), it should be understood that other configurations may be used without departing from the spirit and scope of the invention. For example, an engaging band 44 (shown in dotted lines) extending circumferentially about inner surface 38 of mounting system could also be used as engaging portion 34. In addition, while engaging portion 34 is discussed as being interference fit with vibrational element 12, mounting system 10 may alternatively include vibratory element 12 itself (e.g. by machining vibratory element 12 and isolation member 10 from one piece of metal).

In one embodiment, a portion of isolating surface 32 extends radially outward from isolation member 30 at a position radially opposite each engaging member 36, forming mounting tabs 50. Mounting tabs 50 can be used to indicate the optimum position for mounting of bearings (not shown). These optimum positions are the points where the vibrational amplitude of isolation surface 32 is reduced to its lowest level (for practical purposes, the vibrational amplitude is essentially zero). Intermediate portions 52 of isolating surface 32 extend between mounting tabs 50. Configuring mounting system 10 in this fashion allows a slight radial motion of isolation member 30 to occur between mounting tabs 50, while not transferring this motion to bearings at isolation surface 32.

As illustrated in FIG. 5, engaging members 36 are equidistantly spaced about inner surface 38 of isolation member 30. Each mounting tab 50 extends outward along the same radial dimension as one respective engaging member 36.

Figure 4:
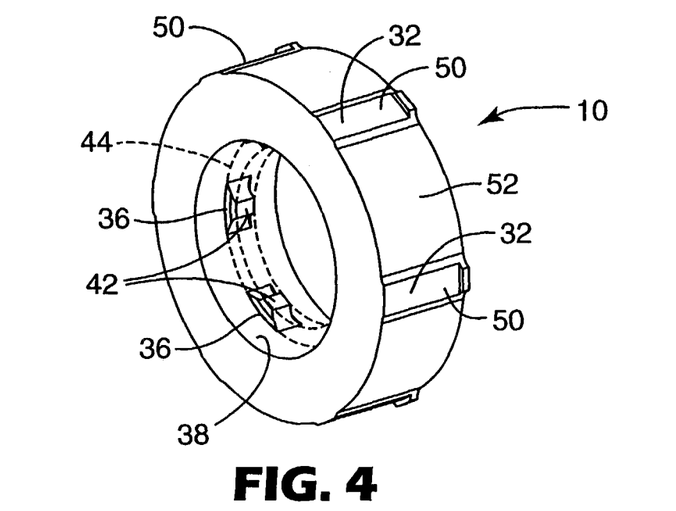
FIG. 4 is an isometric view of one embodiment of the inventive mounting system.
Figure 6:
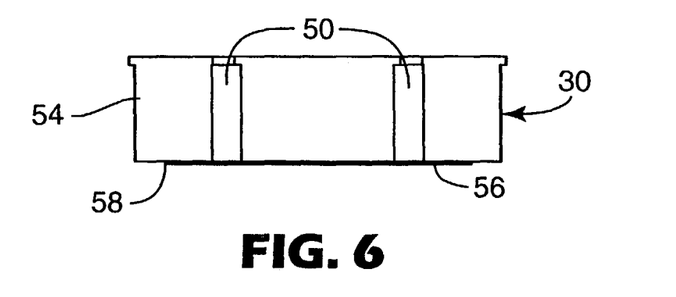
FIG. 6 is an elevational view of one embodiment of the inventive mounting system.

Mounting system 10 can be formed of a single high modulus material (e.g., steel), as illustrated in FIG. 4. Alternatively, a composite mounting system utilizing two or more materials can be used. In one preferred embodiment (see, e.g. FIGS. 5 and 6), isolation member 30 includes outer ring 54 formed of steel having a density of 0.28 lb/in$^3$ and inner ring 56 formed of brass having a density of 0.31 lb/in$^3$. Engaging members 36 are formed integrally with brass inner ring 56 and mounting tabs 50 are formed integrally with steel outer ring 54. While brass and steel are utilized in one embodiment, it should be understood that any materials may be used to form outer ring 54 and inner ring 56, depending upon the end application.

Figure 7:
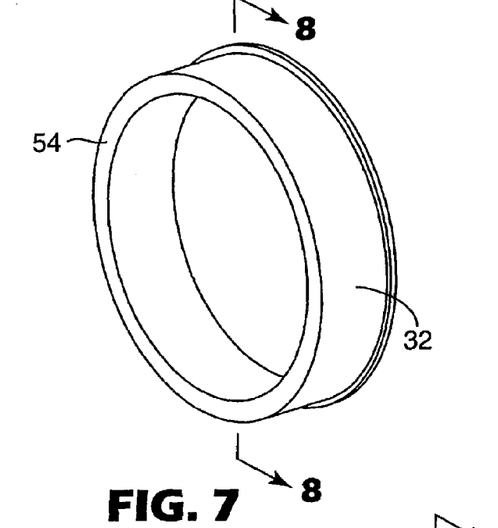
FIG. 7 is an isometric view of one embodiment of an outer ring of the inventive mounting system.
Figure 8:
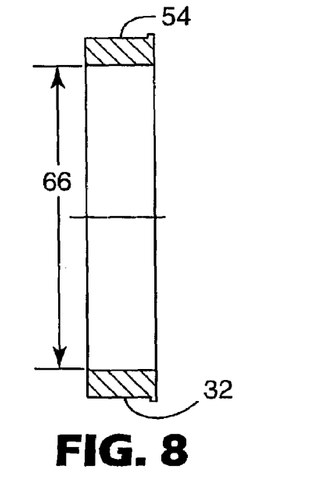
FIG. 8 is a cross-sectional view of one embodiment of an outer ring of the inventive mounting system as taken along line 8—8 of FIG. 7.
Figure 9:
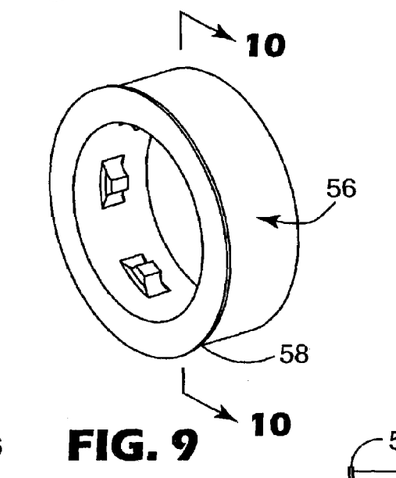
FIG. 9 is an isometric view of one embodiment of an inner ring of the inventive mounting system.
Figure 10:
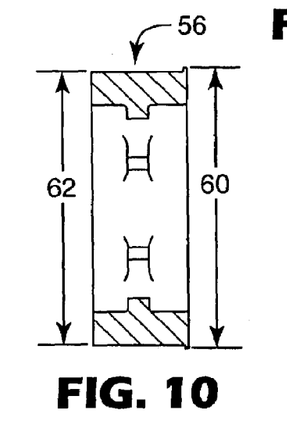
FIG. 10 is a cross-sectional view of one embodiment of an inner ring of the inventive mounting system as taken along line 10—10 of FIG. 9.
Figure 11:
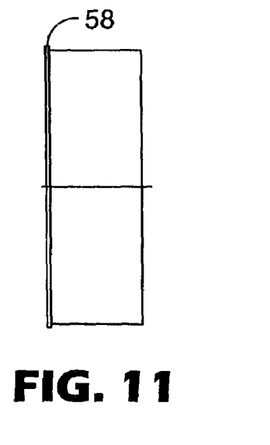
FIG. 11 is a side view of one embodiment of an inner ring of the inventive mounting system.

As illustrated by FIGS. 5, 6, 9, 10, and 11, inner ring 56 is formed with lip 58 having a larger first outer diameter 60 than second outer diameter 62 for remainder of inner ring 56. Inner diameter 66 of outer ring 54, illustrated in FIGS. 5, 6, 7 and 8 is slightly less than second outer diameter 62 of inner ring 56. Thus, lip 58 along with an interference fit between outer and inner ring, 54 and 56, prevent inner ring 56 from translating axially within outer ring 54. FIG. 7 and FIG. 8 illustrate one embodiment of outer ring 54. Note that the embodiment illustrated in FIGS. 7 and 8 does not utilize mounting tabs, as discussed and illustrated previously.

Utilizing multiple materials to form mounting system 10 has the advantage of modifying the resonant frequencies of the mounting system 10. This can be useful during design of the mounting system 10 to ensure the mounting system 10 has a resonant frequency different than that of the vibratory element 12. Additionally, composite materials can increase the ability to modify the geometry of the mounting system 10.

The dimensions of the inventive mounting system can vary according to the size of the vibratory element 12, as well as the frequency of the vibratory element. In the exemplary embodiments described below, a commercially available finite element analysis program was used to arrive at dimensions of two inventive mounting systems 10. The resulting designs were developed based on design criteria including: a specific horn frequency, a desired level of stiffness of the isolation member, and a minimal energy loss through the mounting system. The finite element analysis program used was Pro/Mechanica Structure by Parametric Technology Corp, Needham, Mass. Energy loss through each inventive mounting system 10 was measured using a Branson 935 MA Power Supply and a Branson watt meter, manufactured by Branson Instruments, Danbury, Conn.

First Design

The first design measurements referred to in the tables below was formed utilizing an all-steel non-resonant nodal mount (i.e. the isolation member was formed of solid steel). The second design measurements referred to in the tables below was formed utilizing a composite brass and steel non-resonant mount (i.e. the isolation member was formed of a steel outer ring 54 and a brass inner ring 56.

Material specific parameters used in the finite element model for each design are referred to in the tables below and included: Density of the material(s), Young's modulus of the material(s), Poisson's ratio of the material(s), and the initial dimensions of the non-resonant mount.

A modal analysis procedure in Pro/Mechanica was then executed. The finite element analysis program calculated the resonant frequencies of the nodal mount. The results were inspected to determine if any resonant frequencies of the mounting system 10 occurred at nearly the same frequency as the driving frequency of the vibrational element 12 (which in this case was about 20 Hz). If the resonant frequencies are too close to the driving frequency, the dimensions of the mounting system 10 were then adjusted to shift these frequencies farther from the driving frequency of the vibrational element 12. The analysis was rerun, and the resonant modes were again checked. This was repeated until the resonant modes were spaced sufficiently far (at least 500 Hz) from the driving frequency. The final mounting system designs were built, and the increase in energy consumption caused by the mounting system was measured using the Branson watt meter.

The design criteria, model inputs and modeled dimensions for each mounting system design are shown in the Tables below.

| DESIGN 1: SOLID STEEL NON-RESONANT NODAL MOUNT | | |
| --- | --- | --- |
| DESIGN CRITERIA | MODEL INPUTS | MODELED DIMENSIONS |
| Horn Frequency = 20 KHz | Steel Density = 7500 kg/m$^3$ | Outside Diameter of Isolating Member 0.139 m |
| Frequency with Nodal Mounts Installed = 20 KHz | Steel Elastic Modulus = 203,000 MPa | Inside Diameter of Isolating Member 0.086 m |
| Radial stiffness of isolation member = 4.7 x 10$^8$ N/m | Steel Poisson's Ration: 0.295 | Axial Thickness of Isolating Member 0.038 m |
| Maximum Measured Increase in Power Consumption with Nodal Mounts installed 100 Watts (about 25% increase) | | Engaging Member Radial Height 5.08 x 10$^{-3}$ m (6 members) Engaging Member Area 5.65 x 10$^{-5}$ m$^2$ |

| DESIGN 2: COMPOSITE BRASS AND STEEL NON RESONANT NODAL MOUNT | | |
| --- | --- | --- |
| DESIGN CRITERIA | MODEL INPUTS | MODELED DIMENSIONS |
| Horn Frequency = 20 KHz | Brass Density = 8300 kg/m$^3$ | Steel Ring Outside Diameter 0.139 m |
| Frequency with Nodal Mounts installed = 20 KHz | Brass Elastic Modulus = 103,000 MPa | Steel Ring Inside Diameter 0.114 m |
| Radial stiffness of isolation member = 4.7 x 10$^8$ N/m | Brass Poisson's Ration: 0.35 | Brass Ring Outside Diameter 0.114 m |

-continued

DESIGN 2: COMPOSITE BRASS AND STEEL NON RESONANT NODAL MOUNT

| DESIGN CRITERIA | MODEL INPUTS | MODELED DIMENSIONS |
|---|---|---|
| Maximum Measured Increase in Power Consumption with Nodal Mounts installed = 80 Watts (about 20% increase) | Steel Density = 7500 kg/m$^3$ | Brass Ring Inside Diameter 0.086 |
| | Steel Elastic Modulus = 203,000 MPa | Axial Thickness of Isolating Member 0.038 m |
| | Steel Poisson's Ration: 0.295 | Engaging Member Radial Height 5.08 × 10$^{-3}$ m (6 members) Engaging Member Area 5.65 × 10$^{-5}$ m$^2$ |

Although the present invention has been described with reference to preferred embodiments, workers skilled in the art will recognize that changes may be made in form and detail without departing from the spirit and scope of the invention. Any references and publications cited in the above description are incorporated by reference in their entirety herein.

The invention claimed is:

1. A mounting system for a vibrational element having a longitudinal axis, an outer surface and an axial displacement vibration node on the outer surface comprising:
   an isolation member having an isolation surface, an isolation body and an engaging portion wherein the isolation member further comprises:
      a first ring formed of a first material; and
      a second ring formed of a second material wherein the first ring is integrally formed with the engaging portion;
   wherein the engaging portion is immovably secured to the isolation body at a nodal point and extends radially inward from the isolation body at a point radially opposite the isolation surface so as to engage the outer surface of the vibrational element;
   wherein radial displacements of the vibrational element are substantially decoupled from the isolation surface through the engaging portion; and
   wherein the vibrational element is an ultrasonic horn.

2. The mounting system of claim 1, wherein the first ring is denser than the second ring.

3. The mounting system of claim 1, wherein the first ring and the second ring are interference fit.

4. A mounting system for a vibrational element having a longitudinal axis and an outer surface comprising:
   an isolation member having an isolation surface;
   a plurality of engaging members extending radially from an isolation member at a position radially opposite the isolation surface wherein the engaging members are disposed so as to be normal to the longitudinal axis of the vibrational element when the engaging members are removably secured to the vibrational element;
   wherein the isolation member and the engaging members are non-resonant with the vibrational element;
   wherein the engaging members and isolation member substantially decouple the vibrations of the vibrational element from the isolating surface while having a stiffness of greater than or equal to about 4.7×10$^8$ N/m;
   wherein the vibrational element is an ultrasonic horn; and
   wherein the isolation member further comprises
      a first ring formed of a first material; and
      a second ring formed of a second material, wherein the first ring is integrally formed with the engaging members.

5. The mounting system of claim 4, wherein the first ring is denser than the second ring.

6. The mounting system of claim 4, wherein the first ring and the second ring are interference fit.

* * * * *

UNITED STATES PATENT AND TRADEMARK OFFICE
CERTIFICATE OF CORRECTION

| | | |
|---|---|---|
| PATENT NO. | : 7,243,894 B2 | Page 1 of 1 |
| APPLICATION NO. | : 10/128744 | |
| DATED | : July 17, 2007 | |
| INVENTOR(S) | : Gopal B. Haregoppa | |

It is certified that error appears in the above-identified patent and that said Letters Patent is hereby corrected as shown below:

<u>Cols. 7-8, in (Design 1)</u>

Line 9, delete "Mounts installed 100 Watts" and
insert -- Mounts installed = 100 Watts --, therefor.

Signed and Sealed this

Twentieth Day of November, 2007

JON W. DUDAS
*Director of the United States Patent and Trademark Office*